United States Patent [19]

McVey et al.

[11] 4,208,647
[45] Jun. 17, 1980

[54] THERMAL SWITCH WITH ORGANIC-GLASS BEAD MIXTURE SENSING PELLET

[75] Inventors: John K. McVey, Chicago; Bruce A. Luxon, Bensenville, both of Ill.

[73] Assignee: Illinois Tool Works Inc., Chicago, Ill.

[21] Appl. No.: 940,418

[22] Filed: Sep. 7, 1978

[51] Int. Cl.² .......................................... H01H 37/76
[52] U.S. Cl. .................................. 337/404; 337/401
[58] Field of Search .............. 337/404, 401, 402, 403, 337/405, 406, 407, 408, 409; 29/622, 623

[56] References Cited

U.S. PATENT DOCUMENTS

| | | | |
|---|---|---|---|
| 4,065,741 | 12/1977 | Sakamoto et al. | 337/407 |
| 4,112,576 | 9/1978 | Gross | 29/622 |
| 4,135,176 | 1/1979 | McVey et al. | 337/401 |

FOREIGN PATENT DOCUMENTS 1208268  10/1970  United Kingdom .

Primary Examiner—Harold Broome
Attorney, Agent, or Firm—Glenn W. Bowen; Robert W. Beart

[57] ABSTRACT

A thermal switch for automatically opening a circuit when the ambient temperature exceeds a predetermined level is disclosed which utilizes a sensing pellet formed of an organic-glass bead mixture. The organic-glass bead pellet retains a pair of leads in contact with each other when the ambient temperature is below the melting temperature of the organic material. The addition of the glass beads to the temperature sensing pellet allows the compressive strength that is needed to hold the leads together to be more reliably controlled. In the process of combining the organic material and the glass beads, to form the pellet, the organic material is first melted so as to flow around the beads. Manufacture of the thermal-sensing pellet in this manner eliminates the voids which occur in the pressed organic pellets that are conventionally used in thermal sensing devices. The elimination of these voids increases the strength of the otherwise relatively fragile pellet thereby improving reliability of thermal switches which utilize the improved pellet of the present invention.

17 Claims, 5 Drawing Figures

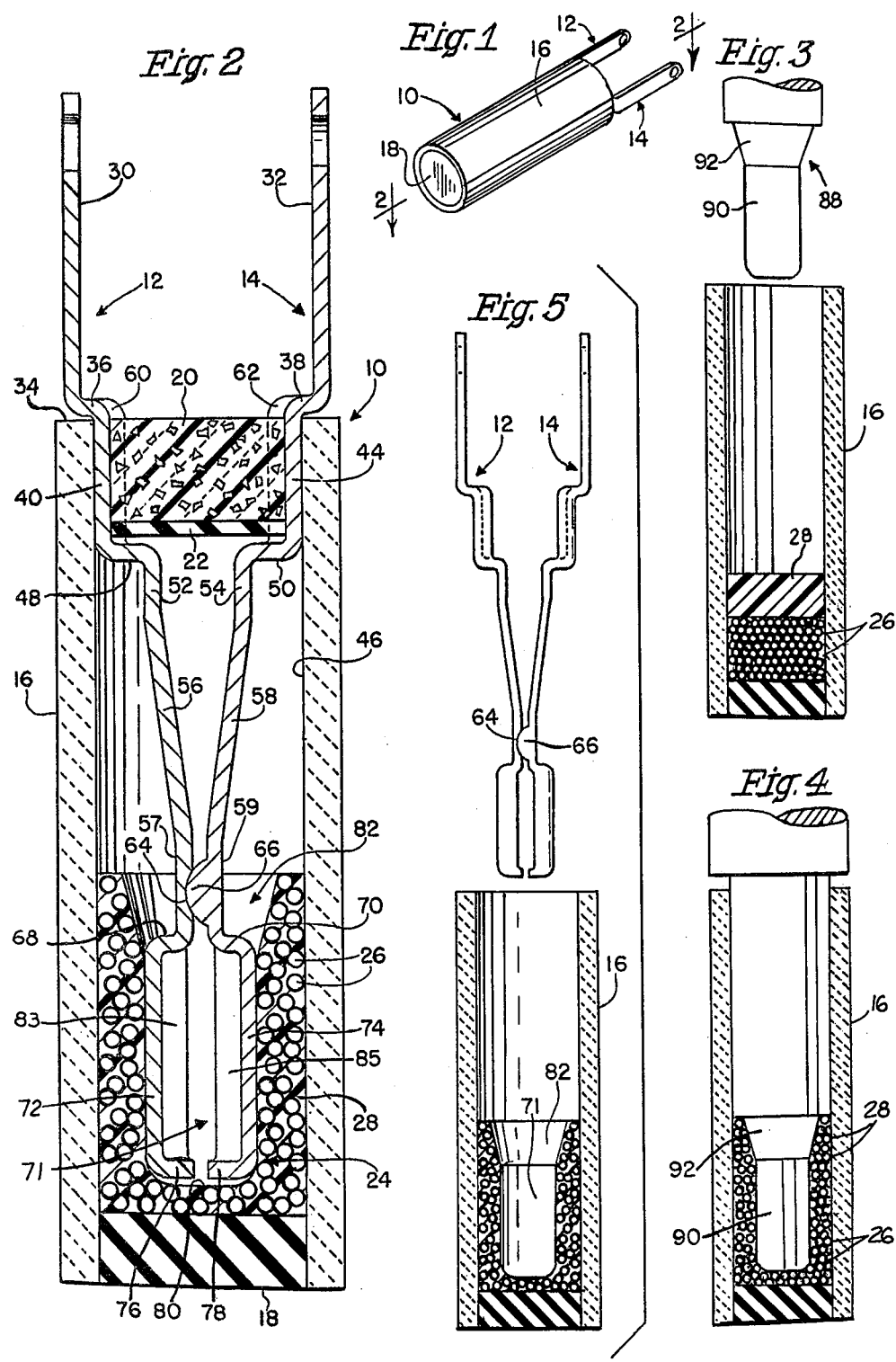

THERMAL SWITCH WITH ORGANIC-GLASS BEAD MIXTURE SENSING PELLET

BACKGROUND OF THE INVENTION

The switch of the present invention consists of a pair of leads which have contact portions thereon that are initially in a closed circuit condition. The leads are held together by a pellet formed of an organic-glass bead mixture which melts when the ambient temperature exceeds the melting temperature of the organic material in the pellet, thereby allowing the contacts to spring apart to open the circuit. A related type of thermal switch is shown in U.S. patent application Ser. No. 844,414 filed Oct. 21, 1977, now U.S. Pat. No. 4,135,176 in the names of John Klose McVey, Bruce Arthur Luxon, and Larry Lee Sharp and assigned to the assignee of the present invention. Like the thermal cut-off device of the present invention, the contacts of the thermal switch of the McVey et al. application are in a normally closed position and one of the contacts has a ball-shaped projection on it.

However, in the present invention the second contact has a socket-shaped indentation on it which receives the ball-shaped projection on the other lead, while in the McVey et al. application, the ball-shaped projection merely contacted the flat surface of the contacting lead. The improved ball and socket connection of the thermal switch of the present invention allows for appreciably greater current capacity, lower temperature rise due to current through the leads and easier assembly of the leads in the device since they tend to lock together during insertion of the leads in the housing of the device, because of the ball and socket arrangement.

Also, in the prior thermal switch of the McVey et al. application a cement layer was also used to seal the bottom portion of the thermal switch, and a pellet of organic material was inserted into the device so that it was separated from the walls of the outer casing by some of the conductive sealing cement. The organic pellet of the device of the prior McVey et al. application, however, like numerous other prior cut-off pellets, was constructed of an organic material that was pressed together to form a coherent mass. Pressing of an organic pellet, results in a structure which has voids in it, and the pellet is structurally relatively weak and subject to cracking or breaking. The present invention also provides a thermal switch which has a much stronger pellet, is less costly because less organic material is required, and is easier to manufacture.

DESCRIPTION OF THE DRAWINGS

The present invention is described by reference to the drawings in which:

FIG. 1 is a perspective view of a thermal switch constructed in accordance with the present invention;

FIG. 2 is a cross-sectional view of the thermal switch of FIG. 1 taken along the lines 2—2 of FIG. 1; and FIGS. 3-5 show the method steps by which the organic material and the glass beads are incorporated into a thermal sensing pellet which has a bore in it that receives the normally closed contact portions of the leads of the device.

TECHNICAL DESCRIPTION OF THE INVENTION

A thermal switch 10 constructed in accordance with the present invention is shown in FIG. 1 wherein the leads 12, 14 extend out of the cylindrical insulated housing 16, which may be made of a ceramic material. FIG. 2 shows a cross-sectional view of FIG. 1 taken along the lines 2—2. The bottom of the housing 16 is sealed by an insulating material of a suitable type, for example, silicone, epoxy or other conventional sealing materials. The upper portion of the housing is sealed by an insulating cement layer 20, which preferably is of a chemical-setting, ceramic-type, such as Sauerisen Cement No. 63, which is produced by Sauerisen Cements Company. Here again, other types of conventional sealing materials may alternately be used. The cement layer 20 is supported on an insulating washer 22 which is preferably made of a silicone-bonded mica, which is held by the leads 12, 14, as will subsequently be described in more detail.

The cylindrical temperature sensing pellet 24 of the present invention is formed of a unified mixture of a organic material and a multitude of spherical glass beads 26, wherein the organic material 28 surrounds the multitude of glass beads and holds them together in a unified mass. The mixture of glass beads and organic material has a high volume of glass beads relative to the volume occupied by the organic material, and this provides a thermal-sensing pellet that has a greatly increased strength over that of conventional pressed pellets.

The leads 12, 14 are constructed with generally parallel terminal ends 30, 32 that extend above the housing 16. Just beyond the top edge 34 of the housing, the inward bends 36, 38 of the leads 12, 14 reduce the spacing between the leads so as to provide a stop for the leads 12, 14 at this point. Short, straight parallel sections 40, 44 of the leads 12, 14 then run in intimate contact with the inside wall 46 of the housing 16, thereby helping to support the leads, to the inward bend sections 48, 50. The inward bend sections 48, 50 project inwardly in a direction that is substantially normal to the lead sections 40, 44 and act to support the insulating washer 22. The leads 12, 14 are then bent downwardly so as to form a pair of short parallel straight segments 52, 54, which are joined by a pair of tapered segments 56, 58 that slope inwardly towards each other. The leads 12, 14 also have transversely extending ridges 60, 62 which extend from the sections 40, 44 down approximately the center of these sections to provide added rigidity to the leads and additional surface area where the cement layer 20 may grip the leads in order to provide a stronger seal. The leads 12, 14 from the bends 48, 50 to the bends 36, 38 may be roughened, or cross-hatched, to strengthen the adhesion of the cement layer 20 to the leads 12, 14, if desired. The portions of the leads 12, 14 that extend above the bends 36, 38 may also be roughened, or cross-hatched, if desired, in order to provide for good surface adhesion of the plating material that is applied to the leads.

The contact portions of the leads 12, 14 are shown immediately below the tapered sections 56, 58. The lead 12 has a socket 64 formed in it which receives a mating ball 66 formed on the lead 14 to provide a normally closed switch. The ball 66 and the socket 64 combination allows for increased current capacity, with a lower temperature rise occurring in the leads for any given current and also for easier assembly of the leads 12, 14 into the housing 16 since the leads will tend to lock together when the ball is fitted into the socket. Below the ball and socket connection, the leads 12, 14 are provided with reverse bend sections 68, 70 and a pair of straight, parallel sections 72, 74 which are spaced apart farther due to the reverse bend sections 68, 70 so that a larger bore 71 may be provided in the pellet 24. The leads then terminate in the inwardly bent sections 76, 78 which are provided to keep the ends of the leads from scraping the inside of the pellet 24 when they are inserted into the bore 71. Strengthening ridges 83, 85 are preferably provided down the center of the parallel sections 72, 74 to add rigidity to the leads in this area.

The thermal switch of the present invention, as previously mentioned, utilizes a pellet 24 which is the unified mixture of organic material that melts at a predetermined temperature and a multitude of spherical glass beads that remain solid at this temperature. The pellet extends from the bottom plug 18 to a line just above the contact structure that is formed by the socket 64 and the ball 66. The bore 82 in the pellet 24, which initially receives the leads 12, 14, preferably is larger in diameter at the top of the bore 82 than the bore 71 in order to facilitate insertion of the leads 12, 14 into the pellet 24. The pellet strength required to hold the leads 12, 14 in contact with each other, as shown in FIG. 1, is in a large measure provided by the beads 26, which may be spherical, or of other shapes, and which may be made of glass or other solid insulating material. When the organic material 28 melts, it no longer is able to hold the spherical beads 26 in place, and therefore they will move and as a result the movement of the spring load leads, 12, 14 will separate, thereby breaking the electrical contact between the leads 12, 14 that was established by the ball and socket connection. With the insulating beads 26 included in the pellet, the organic material no longer need be relied on to provide all of the strength of the pellet. A more reliable and less fragile sensing pellet is thereby provided. Additionally, the possibility of using organic sensing materials that previously might have been rejected because of low structural strength now is a possible alternative.

The leads 12, 14 preferably have a bimetallic structure of copper and stainless steel layers. These layers are preferably plated with a flash of nickel and silver. The copper layer provides a large current carrying capacity for the leads while the stainless steel layer provides for good spring action at elevated temperatures. The stainless steel layer is preferably provided so that it faces the cylindrical inside wall 46 while the copper layers of the two leads face each other. The silver plating over the leads will reduce contact resistance while the nickel flash plating is employed to prevent migration of the silver into the copper layer at elevated temperatures.

The term "insulating" as used herein in describing the properties of various components of the described thermal switch refers to the property of electrical insulation. Thus, while glass beads are good electrical insulators, they are also relatively good conductors of heat, and this is an advantage in the manufacture of the device as described subsequently herein.

The method of manufacture of the thermal switch of FIGS. 1 and 2 is illustrated in FIGS. 3-5. The ceramic housing 16, which is preferably made of steatite and which may be manufactured by pressing or extruding, is positioned in a vertical position and is closed off at the bottom by an insulating plug 18 that is preferably made of 1/16 inch silicone sheet. The plug 18 is forced into the bottom end of the ceramic housing 16, and once in place it acts as a stopper to keep molten organic material 28 from leaking out of the housing. After the plug 18 has been forced into the bottom of the housing 16, the insulating beads 26 are dispensed into the plugged housing. A pill 28 of organic material is then placed on top of the glass beads, as show in FIG. 3. Spherical glass beads are preferred, but other shapes and materials may be used. By setting the pill 28 on top of the glass beads, two advantages are obtained. First, the glass beads are good conductors of heat, and this results in the transmission of heat readily to the pill 28. Next, since the pill 28 lies on top of the glass beads, which have a substantially higher melting temperature than the melting temperature of the organic material, the organic material will flow down over the beads, due to gravity, as it melts. After the organic material 28 has melted and is dispersed around the glass beads 26, a core pin 88 that has an elongated cylindrical end 90 and a tapered intermediate section 92, is inserted into the glass-bead organic mixture to form a core hole, or bore 71 that has a flared upper bore 82.

Resolidification of the unified mass of glass-beads and organic material follows with the core pin 88 inserted into the glass-bead organic mixture. Once the organic material has resolidified, the core pin 88 is removed and the leads 12, 14 are inserted into the bore 71 as shown in FIG. 4. When the leads have been inserted, the washer 22 is placed between the leads to keep them spaced apart. The ceramic sealing cement layer 20 is next dispensed on the washer 22 so as to seal the upper end of the housing 16 and to cement the leads 12, 14 to the housing. The ceramic sealing cement may be of the heat-curable kind, and the entire assembly would then be placed in an oven to allow the cement to set. After the cement layer 20 is set the device is dipped into a bath of cooled silicone which has been thinned with solvents. The silicone dip is used to draw silicone into the pores of the ceremic housing to seal the device from the atmosphere. After the silicone dip has been cured, the thermal switch is then ready for identification marking and packaging.

What is claimed is:

1. In a thermal switch comprising a housing, a pair of electrical leads, contact means in said housing for forming a circuit connection between said electrical leads and a thermal-sensing element for controlling said contact means, the improvement wherein said thermal-sensing pellet is formed of a multitude of solid insulating particles that are surrounded and held in a unified mass by a thermal-sensing material that melts at a predetermined temperature while said insulating particles remain solid at said predetermined temperature, wherein said thermal sensing material is an organic material and said insulating particles are comprised of a multitude of spherical-shaped insulating beads and the volume of the insulating beads substantially exceeds the volume of the thermal-sensing material.

2. A thermal switch as claimed in claim 1 wherein said thermal-sensing material is an organic material.

3. A thermal switch as claimed in claim 1 wherein said insulating particles are comprised of a multitude of spherically-shaped insulating balls.

4. A thermal switch as claimed in claim 1 wherein said leads are formed so that said contact portions of said leads consist of a ball configuration on one lead and a mating socket configuration on the other.

5. A thermal switch as claimed in claim 1 wherein said thermal sensing material is an organic material and said insulating particles are comprised of a multitude of spherical-shaped insulating beads in which the volume of the insulating beads substantially exceeds the volume of the thermal-sensing materials.

6. A thermal switch as claimed in claim 5 wherein said leads are formed so that said contact portions of said leads consist of a ball configuration on one lead and a mating socket configuration on the other.

7. In a thermal switch as claimed in claim 6 the further improvement wherein said housing is generally cylindrical in shape, and thermal-sensing element is generally cylindrical in shape and fits into said housing so that the outer periphery of said thermal-sensing element engages the inner periphery of said housing, and said thermal-sensing element has a central bore in it which receives said contact portions of said leads therein and holds said contact portions in a normally closed position, and said leads are formed to spring apart upon the melting of said thermal-sensing material in said thermal-sensing element so as to thereby separate said contact portions.

8. A thermal switch comprising an insulating housing, a pair of electrical leads that extend into said housing and that project therefrom comprising contact portions formed on said leads and located in said housing for forming a circuit connection between said leads and spring portions formed on said leads that are constructed so that said contact portions of said leads tend to spring apart and a thermal-sensing element that engages and holds said contact portions of said leads together against the spring forces developed by said spring portions as long as the ambient temperature remains below a predetermined temperature, said thermal-sensing element comprising a multitude of solid insulating particles that are surrounded and held in a unified mass by a thermal-sensing material that melts at said predetermined temperature while said insulating particles remain solid at said predetermined temperature, wherein said thermal-sensing material is an organic material and said insulating particles are comprised of a multitude of spherical-shaped insulating beads and the volume of the insulating beads substantially exceeds the volume of the thermal-sensing material.

9. A thermal switch as claimed in claim 8 wherein said thermal-sensing material is an organic material.

10. A thermal switch as claimed in claim 8 wherein said insulating particles are comprised of a multitude of spherically-shaped insulating balls.

11. A thermal switch as claimed in claim 8 wherein said contact portions on said leads consist of a ball configuration on one of said leads and a mating socket configuration on the other of said leads.

12. A thermal switch as claimed in claim 8 wherein said thermal sensing material is an organic material and said insulating particles are comprised of a multitude of spherical-shaped insulating beads in which the volume of the insulating beads substantially exceeds the volume of the thermal-sensing material.

13. A thermal switch as claimed in claim 12 wherein said leads are formed so that said contact portions of said leads consist of a ball configuration on one lead and a mating socket configuration on the other.

14. A method of constructing a thermal switch comprising positioning and insulating housing having a sealed bottom and an open top in a vertical position, dispensing a multitude of solid, insulating particles into the bottom of said housing, disposing a thermal sensing pill, which melts at a substantially lower temperature than said insulating particles, on top of said insulating particles, heating said pill so that the thermal-sensing material of said pill melts and flows around said insulating particles, inserting a core pin into said mixture of melted thermal-sensing material and unmelted insulating particles so as to form a core hole therein upon solidification of said thermal-sensing material around said insulating particles and removal of said core pin from said housing and inserting contact portions of a pair of leads into said core hole so that said solidified mass of thermal-sensing material and insulating particles will hold said contact portions together in a closed circuit configuration until said thermal-sensing material is again melted.

15. A method as claimed in claim 14 wherein said insulating particles are constructed of a good heat conducting material and are heated at the same time said thermal-sensing material is heated.

16. A method of forming a thermal-sensing element for use in thermal switch devices comprising disposing a thermal sensing-material in solid form above a multitude of solid particles in a container, wherein said particles melt at a substantially higher temperature than said thermal-sensing material, heating said thermal-sensing material so that said thermal-sensing material flows down over said particles to form a mixture of said thermal-sensing material and said particles in said container, inserting a core pin into said mixture while said thermal-sensing material in said mixture is still a fluid and removing said core pin upon solidification of said thermal-sensing material so as to form a core hole in the solidified mass of said thermal-sensing material and said particles.

17. A method as claimed in claim 16 wherein said particles are electrically insulating and are formed of a good heat conducting material and are heated at the same time said thermal-sensing material is heated.

* * * * *